(12) United States Patent
Yamakawa et al.

(10) Patent No.: US 10,652,378 B2
(45) Date of Patent: *May 12, 2020

(54) INTERCOM SYSTEM

(71) Applicant: AIPHONE CO., LTD., Nagoya-shi, Aichi (JP)

(72) Inventors: Seiya Yamakawa, Nagoya (JP); Akira Kai, Nagoya (JP); Yuta Shimomura, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/089,344

(22) PCT Filed: Mar. 22, 2017

(86) PCT No.: PCT/JP2017/011507
§ 371 (c)(1),
(2) Date: Sep. 27, 2018

(87) PCT Pub. No.: WO2017/170057
PCT Pub. Date: Oct. 5, 2017

(65) Prior Publication Data
US 2019/0132433 A1    May 2, 2019

(30) Foreign Application Priority Data
Mar. 28, 2016    (JP) .................. 2016-063065

(51) Int. Cl.
*H04M 9/00* (2006.01)
*H04M 1/02* (2006.01)
(Continued)

(52) U.S. Cl.
CPC ......... *H04M 1/0291* (2013.01); *H04M 7/009* (2013.01); *H04M 9/02* (2013.01); *H04M 11/025* (2013.01)

(58) Field of Classification Search
USPC ................................................... 379/167.01
See application file for complete search history.

(56) References Cited

U.S. PATENT DOCUMENTS 5,612,994 A * 3/1997 Chen ..................... H04N 7/186
348/14.01
5,754,637 A * 5/1998 Choi ..................... H04M 11/025
379/167.11
(Continued)

FOREIGN PATENT DOCUMENTS

JP    62245836 A    10/1987
JP    2000013516 A    1/2000
(Continued)

OTHER PUBLICATIONS

International Search Report and Written Opinion for related International Application No. PCT/JP2017/011507 dated May 23, 2017; English translation of ISR provided; 9 pages.
(Continued)

*Primary Examiner* — Quoc D Tran
(74) *Attorney, Agent, or Firm* — Procopio, Cory, Hargreaves & Savitch LLP

(57) ABSTRACT

The intercommunication system according to the invention is an intercommunication system used in an apartment complex comprising plural residential buildings. Each of the plural residential buildings is equipped with room parent devices installed in respective rooms; a collective entrance device which enables a call manipulation for calling one of the room parent devices; and a building control unit which connects, by an intercom line, the collective entrance device and the room parent devices of the respective rooms of the residential building. The collective entrance device has a storage unit which is stored with terminal information of the collective entrance device. The building control units of the plural respective residential buildings are connected to each
(Continued)

other by a network in which a communication is performed according to a general-purpose protocol and can communicate, over the network, with an external apparatus that is connected to an external network.

5 Claims, 8 Drawing Sheets

(51) Int. Cl.
*H04M 9/02* (2006.01)
*H04M 7/00* (2006.01)
*H04M 11/02* (2006.01)

(56) References Cited

U.S. PATENT DOCUMENTS

| | | | |
|---|---|---|---|
| 6,058,174 A * | 5/2000 | Borshchevsky | H04M 1/0291 |
| | | | 379/167.02 |
| 6,879,670 B2 * | 4/2005 | Shinozaki | H04M 1/274525 |
| | | | 379/167.01 |
| 7,783,018 B1 | 8/2010 | Goldberg | |
| 10,298,771 B1 * | 5/2019 | Yamakawa | H04M 9/02 |
| 2003/0185367 A1 | 10/2003 | Shinozaki et al. | |
| 2004/0057567 A1 * | 3/2004 | Lee | H04M 9/001 |
| | | | 379/167.01 |
| 2007/0047712 A1 * | 3/2007 | Gross | H04M 11/025 |
| | | | 379/167.01 |
| 2011/0007883 A1 * | 1/2011 | Bingham | H04M 11/025 |
| | | | 379/93.17 |
| 2012/0161947 A1 * | 6/2012 | Lee | H04N 7/186 |
| | | | 340/286.06 |
| 2014/0219431 A1 * | 8/2014 | Wagner | H04M 11/025 |
| | | | 379/167.02 |
| 2018/0027124 A1 * | 1/2018 | Maruyama | H04M 9/00 |
| | | | 379/167.02 |
| 2018/0295243 A1 * | 10/2018 | Shimomura | H04M 11/025 |

FOREIGN PATENT DOCUMENTS

| | | |
|---|---|---|
| JP | 2001231031 A | 8/2001 |
| JP | 2003-289390 A | 10/2003 |
| JP | 2003309662 A | 10/2003 |
| JP | 2004201250 A | 7/2004 |
| JP | 2004-260679 A | 9/2004 |
| JP | 2005-184593 A | 7/2005 |
| JP | 2005244357 A | 9/2005 |
| JP | 2007013671 A | 1/2007 |
| JP | 2007-202017 A | 8/2007 |
| JP | 2010178212 A | 8/2010 |
| JP | 2010178072 A | 12/2010 |
| JP | 2012-015943 A | 1/2012 |
| JP | 2013-211727 A | 10/2013 |
| JP | 2013232764 A | 11/2013 |
| JP | 2014-045307 A | 3/2014 |
| JP | 2014086791 A | 5/2014 |
| JP | 2015-073143 A | 4/2015 |

OTHER PUBLICATIONS

Notification of Reasons for Refusal for related JP App No. 2016-063065, dated Sep. 10, 2019, 9 pgs.
Extended European Search Report dated Jun. 18, 2019 issued for International Patent Application No. PCT/JP2017/011507, 8 pgs.
Information Offer Form for related JP App No. 2016-063065 dated Jun. 10, 2019, 33 pgs.
General Catalog 2013 for Apartment HA System, Panasonic Corporation, ECO Solutions Company, Marketing Division, Urban Environment Product Sales Planning Department, Jun. 2013, 7 pgs.
Notification for Reasons for Refusal for related JP App No. JP-OA 2016-063065 dated Dec. 3, 2019. English translation provided, 7 pages.
Office Action for related JP App. No. 2016-063065, dated Dec. 6, 2019; English translation provided. 33 pages.

* cited by examiner

Fig.6

| RESIDENTIAL BUILDING-A | | CALL TABLE A1 |
|---|---|---|
| ROOM NO. | DWELLER NAME | ROOM PARENT DEVICE ID |
| 101 | ABE | S1 |
| 102 | TANAKA | S2 |
| 103 | JONES | S3 |
| ⋮ | ⋮ | ⋮ |

| RESIDENTIAL BUILDING-B | | CALL TABLE B1 |
|---|---|---|
| ROOM NO. | DWELLER NAME | ROOM PARENT DEVICE ID |
| 101 | SUZUKI | T1 |
| 102 | Harry | T2 |
| 103 | Conceal Café | T3 |
| ⋮ | ⋮ | ⋮ |

| RESIDENTIAL BUILDING-E | | CALL TABLE E1 |
|---|---|---|
| ROOM NO. | DWELLER NAME | ROOM PARENT DEVICE ID |
| 101 | Restaurant bel | U1 |
| 102 | IIZUKA | U2 |
| 103 | AOKI | U3 |
| ⋮ | ⋮ | ⋮ |

Fig.7

| RESIDENTIAL BUILDING-A | | CALL TABLE A2 |
|---|---|---|
| ROOM NO. | DWELLER NAME | ROOM PARENT DEVICE ID |
| A101 | ABE | S1 |
| A102 | TANAKA | S2 |
| A103 | JONES | S3 |
| ⋮ | | ⋮ |

| RESIDENTIAL BUILDING-B | | CALL TABLE B2 |
|---|---|---|
| ROOM NO. | DWELLER NAME | ROOM PARENT DEVICE ID |
| B101 | SUZUKI | T1 |
| B102 | Harry | T2 |
| B103 | Conceal Café | T3 |
| ⋮ | | ⋮ |

⋮

| RESIDENTIAL BUILDING-E | | CALL TABLE E2 |
|---|---|---|
| ROOM NO. | DWELLER NAME | ROOM PARENT DEVICE ID |
| E101 | Restaurant bel | U1 |
| E102 | IIZUKA | U2 |
| E103 | AOKI | U3 |
| ⋮ | | ⋮ |

INTERCOM SYSTEM

CROSS-REFERENCE TO RELATED APPLICATIONS

This application is a U.S. National Stage entry of PCT Application No: PCT/JP2017/011507 filed on Mar. 22, 2017, which claims priority to Japanese Patent Application No. 2016-063065, filed Mar. 28, 2016, the contents of which are incorporated herein by reference.

TECHNICAL FIELD

The present invention relates to an intercommunication system used in an apartment complex.

BACKGROUND ART

Intercommunication systems for an apartment complex comprising plural residential buildings are known as conventional systems. Such intercommunication systems are configured in such a manner that each residential building is connected to a control apparatus by an intercom line (intercom dedicated line).

PRIOR ART DOCUMENTS

Patent Documents

Patent document 1: JP-A-2004-260679

SUMMARY OF THE INVENTION

Problems to be Solved by the Invention

Patent document 1 discloses an intercommunication system that is configured in such a manner that a control apparatus connected to individual residential buildings manages call signals etc. sent from the individual residential buildings intensively. In this configuration, in the event of trouble such as damaging of data or software in the control apparatus due to, for example, lightning, a person from a maintenance company needs to visit a building where the control apparatus exists, determine a cause of the trouble by manipulating the control apparatus via a personal computer in which a diagnosis/repair tool etc. are installed, and carry out repair work that is suitable for the cause. As such, the intercommunication system disclosed in Patent document 1 is heavy in the load of maintenance.

An object of the invention is therefore to provide an intercommunication system capable of reducing the load of maintenance.

Means for Solving the Problems

To attain the above object, the invention provides an intercommunication system which is used in an apartment complex comprising plural residential buildings, each of the plural residential buildings comprising:
  room parent devices installed in respective rooms;
  a terminal device which enables a call manipulation for calling one of the room parent devices; and
  a building control unit which connects, by an intercom line, the terminal device and the room parent devices of the respective rooms of the building, wherein:
  the terminal device comprises a storage unit which is stored with terminal information of the terminal device; and
  the building control units of the plural respective residential buildings are connected to each other by a network in which a communication is performed according to a general-purpose protocol and can communicate, over the network, with an external apparatus that is connected to an external network.

According to this configuration, in the event of trouble occurring in a terminal device (collective entrance device, management room parent device, or the like) of a residential building, a maintenance company can access the building control unit of the residential building in which the terminal device in trouble is installed using, for example, an external apparatus (e.g., computer) that is connected to the external network. The building control unit is connected to the terminal devices by the intercom line. Thus, the maintenance company can carry out maintenance work for the terminal device in trouble via the building control unit. Since in this manner the maintenance company can carry out maintenance work from outside without the need for sending a person to the residential building where the terminal device in trouble exists. The load of maintenance can thus be reduced.

In the intercommunication system according to the invention, the building control unit of each of the plural residential buildings may comprise a building controller having:
  a first conversion unit which converts a signal that can be communicated through the intercom line in the building where the building control unit is installed into a signal that can be communicated through the network according to the general-purpose protocol; and
  a second conversion unit which converts a signal that can be communicated through the network according to the general-purpose protocol into a signal that can be communicated through the intercom line in the building where the building control unit is installed.

According to this configuration, the intercom line in each building and the network in which a communication is performed according to the general-purpose protocol are connected to each other by the building controller of the building control unit so as to enable a communication between them.

The intercommunication system according to the invention may be such that:
  plural terminal devices are installed in at least one of the residential buildings; and
  the building controller of the at least one residential building has a building storage unit which is stored with building terminal information that is a combination of pieces of terminal information stored in the storage units of the plural respective terminal devices in the at least one residential building.

According to this configuration, when the terminal information stored in a storage unit has been damaged, the building terminal information stored in the building storage unit of the building controller can be used as backup data.

The intercommunication system according to the invention may be such that the building controller comprises a forming unit which forms the building terminal information by acquiring the pieces of terminal information from the plural terminal devices that are installed in the building where the building controller is installed and are connected to the building controller.

According to this configuration, when the building terminal information stored in a building controller is damaged, the building terminal information can be restored by acquiring the pieces of terminal information from the terminal devices.

Advantages of the Invention

The intercommunication system according to the invention can reducing the load of maintenance.

BRIEF DESCRIPTION OF THE DRAWINGS

FIG. 6 shows example call tables A1-E1 which are stored in terminal devices of residential building-A to residential building-E.

FIG. 7 shows example call tables A2-E2 which are stored in building control units of residential building-A to residential building-E, respectively.

MODES FOR CARRYING OUT THE INVENTION

An exemplary embodiment will be hereinafter described with reference to the drawings.

Figure 1:
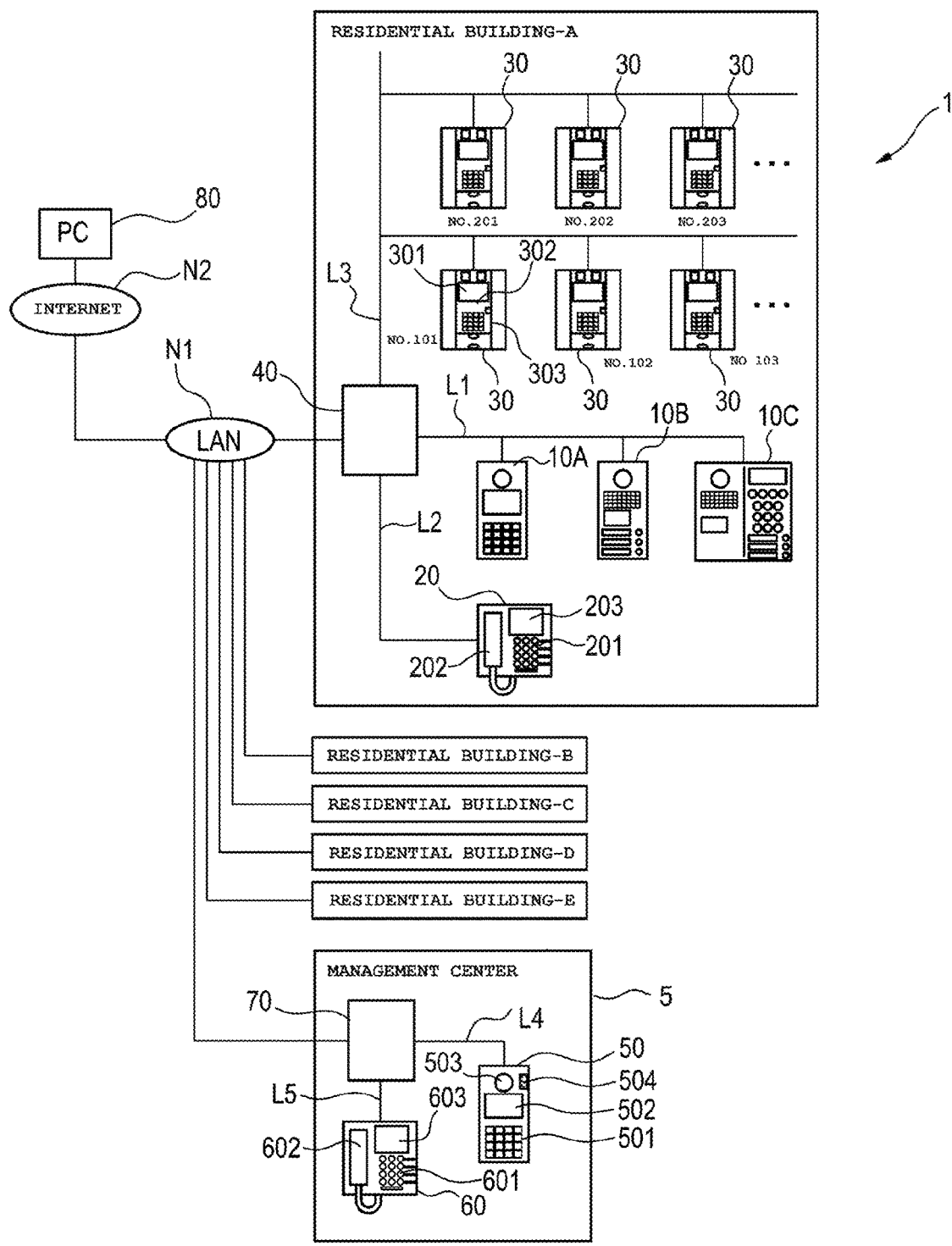
FIG. 1 shows the configuration of an intercommunication system according to an embodiment of the present invention.

As shown in FIG. 1, an intercommunication system 1 is a system used for an apartment complex comprising plural residential buildings (in the embodiment, residential building-A to residential building-E). The intercommunication system 1 is equipped with, in each of residential building-A to residential building-E, collective entrance devices 10A, 10B and 10C (example terminal devices), a management room parent device 20 (example terminal device), room parent devices 30, and a building control unit 40. FIG. 1 which relates to the embodiment shows these devices and unit only for residential building-A.

The residential buildings are connected to each other by a network N1 (in the embodiment, LAN (local area network)) in which a communication is performed according to a general-purpose protocol. Each residential building is configured so as to be able to communicate, over the network N1, with an external apparatus 80 (in the embodiment, a PC (personal computer) which is connected to an external network (in the embodiment, the Internet) N2. The intercommunication system 1 is provided with a management center 5 (intensive building) which is connected to the individual residential buildings by the network N1.

The collective entrance devices 10A, 10B, and 10C (hereinafter may be referred to as a generic term "collective entrance device(s) 10") are installed in, for example, each collective entrance or shared space of the apartment complex. The collective entrance devices 10 are configured so as to be able to call, for example, a room parent device 30 or the management room parent device 20 in the building where it is installed. Furthermore, the collective entrance devices 10 are configured so as to be able to take an image of a visitor, for example. For example, the collective entrance devices are of a type in which a room number is to be input using a ten-key unit (collective entrance device 10A), a type in which a dedicated button that is correlated with a name is to be pushed (collective entrance device 10B), or of a composite type of the type with the ten-key unit and the type with the dedicated buttons (collective entrance device 10C). The collective entrance devices 10 are connected to the building control unit 40 by an intercom line (dedicated line) L1 so as to be able to communicate with it.

The management room parent device 20 is installed in each management room of the apartment complex. The management room parent device 20 is configured so as to be able to call, for example, a room parent device 30 in the building where it is installed. Equipped with a manipulation unit 201, a conversation unit 202, a display unit 203, etc., the management room parent device 20 is configured so as to enable a phone conversation with a visitor standing near a collective entrance device 10 or a dweller standing near a room parent device 30. The management room parent device 20 is connected to the building control unit 40 by an intercom line L2 so as to be able to communicate with it.

The room parent device 30 is installed in each dwelling unit of the apartment complex. Equipped with a display unit 301, a manipulation unit 302, a conversation unit 303, etc., the room parent device 30 is configured so as to be able to respond to a call from, for example, a collective entrance device 10 or the management room parent device 20. The individual room parent device 30 is stored with information for identification of it (e.g., room parent device ID (identification)). The room parent device 30 is connected to the building control unit 40 by an intercom line L3 so as to be able to communicate with it.

The building control unit 40 controls, for example, a communication with the collective entrance devices 10, the management room parent device 20, and the room parent devices 30 which are connected to it by the intercom lines L1-L3. The building control unit 40 is connected to the building control units 40 of the other residential buildings (in the embodiment, residential building-B to residential building-E) and an intensive control unit 70 (described later) of the management center 5 by the network N1 so as to be able to communicate with them. Furthermore, the building control unit 40 can be rendered capable of communicating with the external apparatus 80 which is connected to the external network N2 via the network N1.

The external apparatus 80 has, among other things, a diagnosis tool for diagnosing trouble in the collective entrance devices 10, the management room parent device 20, etc., a repair tool for performing repair processing, and driver software for allowing the collective entrance devices 10, the management room parent device 20, etc. to operate. For example, these pieces of software may be installed in the external apparatus 80 or stored in an external memory.

The management center 5 is configured so as to be able to manage the entire apartment complex, that is, residential building-A to residential building-E, and is equipped with an intensive collective entrance device 50 (example intensive terminal device), an intensive management room parent device (example intensive terminal device), and the intensive control unit 70.

The intensive collective entrance device 50 is installed in an entrance of the management center 5. The intensive collective entrance device 50 has a call unit 501, a display unit 502, a camera 503, a conversation unit 504, etc. The intensive collective entrance device 50 is configured so as to be able to call, for example, a room parent device 30 of each building and the intensive management room parent device 60 of the management center 5. The intensive collective entrance device 50 is configured so as to be able to take an image of a visitor, for example. The intensive collective entrance device 50 is connected to the intensive control unit 70 by an intercom line L4 so as to be able to communicate with it.

The intensive management room parent device 60 is installed in a management room of the management center 5. The intensive management room parent device 60 has a manipulation unit 601, a conversation unit 602, a display unit 603, etc. The intensive management room parent device 60 is configured so as to be able to call, for example, a room parent device 30 of each building. The intensive management room parent device 60 is configured so as to enable a phone conversation with a visitor standing near the intensive collective entrance device 50 or a dweller standing near a room parent device 30. The intensive management room parent device 60 is connected to the intensive control unit 70 by an intercom line L5 so as to be able to communicate with it.

The intensive control unit 70 controls, for example, exchange of a communication with the intensive collective entrance device 50 and the intensive management room parent device 60 which are connected to it by the intercom lines. The intensive control unit 70 is connected to the building control unit 40 of each of residential building-A to residential building-E by the network N1.

Figure 2:
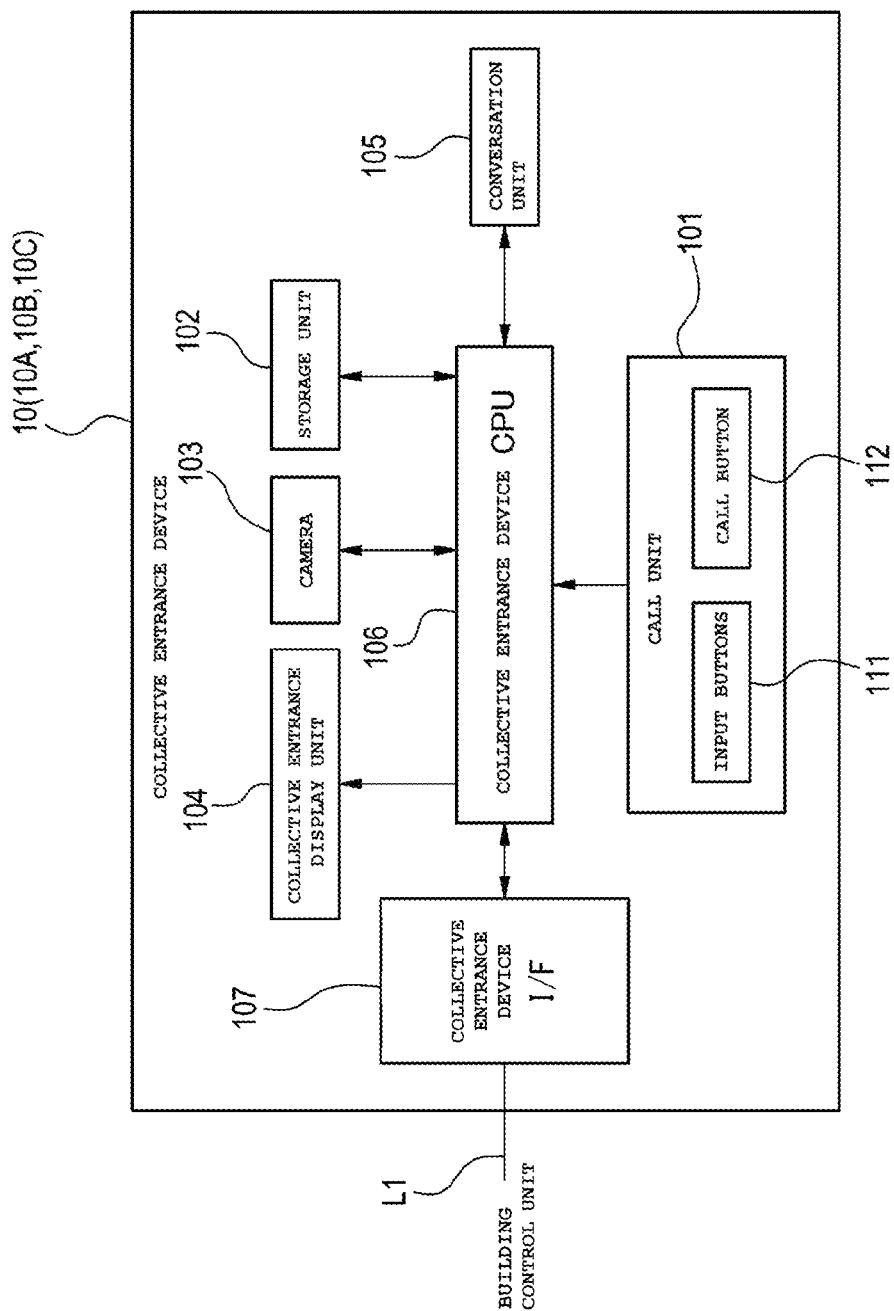
FIG. 2 is a functional block diagram of a collective entrance device.

As shown in FIG. 2, each collective entrance device 10 is equipped with a call unit 101, a storage unit 102, a camera 103, a collective entrance display unit 104, a conversation unit 105, a collective entrance device CPU 106, and a collective entrance device interface 107 (in the following, the term "interface" will be abbreviated as "I/F").

The call unit 101 is manipulated when a visitor or the like calls the room parent device 30 of a visit destination or the management room parent device 20 in the management room. The call unit 101 has input buttons (a ten-key unit, dedicated buttons, or the like) 111, a call button 112 to be manipulated after manipulation of the input buttons, and other things.

The storage unit 102 is stored with terminal information of the collective entrance device 10. For example, the storage unit 102 is stored with, among other information, a call table in which room numbers of the rooms of the building where it is installed are correlated with room parent device IDs for identification of the room parent devices 30 of the rooms, respectively, or a call table in which room numbers of the rooms of the building where it is installed and names of dwellers of rooms and names (e.g., tenant names) of rooms are correlated with room parent device IDs, respectively. For example, the storage unit 102 is also stored with drive software that allows the collective entrance device 10 to operate.

The camera 103 takes an image of a visitor or the like who is manipulating the collective entrance device 10. The collective entrance display unit 104 displays a room number that is input through the call unit 101, a message to the visitor, an image taken by the camera 103, and other information. The conversation unit 105 is composed of a microphone and a speaker for a conversation with a dweller or a manager.

The collective entrance device CPU 106 performs processing for controlling the operation of each of the components of the collective entrance device 10. For example, the collective entrance device CPU 106 runs the driver software that allows the collective entrance device 10 to operate. For example, when a room number or a name is input, the collective entrance device CPU 106 converts an input signal into a room parent device ID of a call target room parent device 30 on the basis of the call table. Furthermore, for example, the collective entrance device CPU 106 executes a driver (software) that allows the collective entrance device 10 to operate. Still further, for example, the collective entrance device CPU 106 restarts the collective entrance device 10 if a bug has occurred in the display contents of the collective entrance display unit 104 or a freeze has occurred.

The collective entrance device I/F 107 forms a bidirectional signal transmission path between the collective entrance device CPU 106 and the intercom line L1.

Although not shown in any drawings, like the collective entrance devices 10, the management room parent device 20 has a storage unit that is stored with terminal information (a call table, driver software, etc.). Like the collective entrance device CPU 106, a management parent device CPU transmits a room parent device ID obtained through conversion on the basis of the call table to each room parent device in the building where it is installed, runs the driver software, and restarts the management room parent device 20. A terminal device having a function of calling each room parent device 30 may be installed in, for example, a party room that is used as a shared room or a sub-entrance that is different from a main entrance in addition to the ones installed in the collective entrance and the management room.

Figure 3:
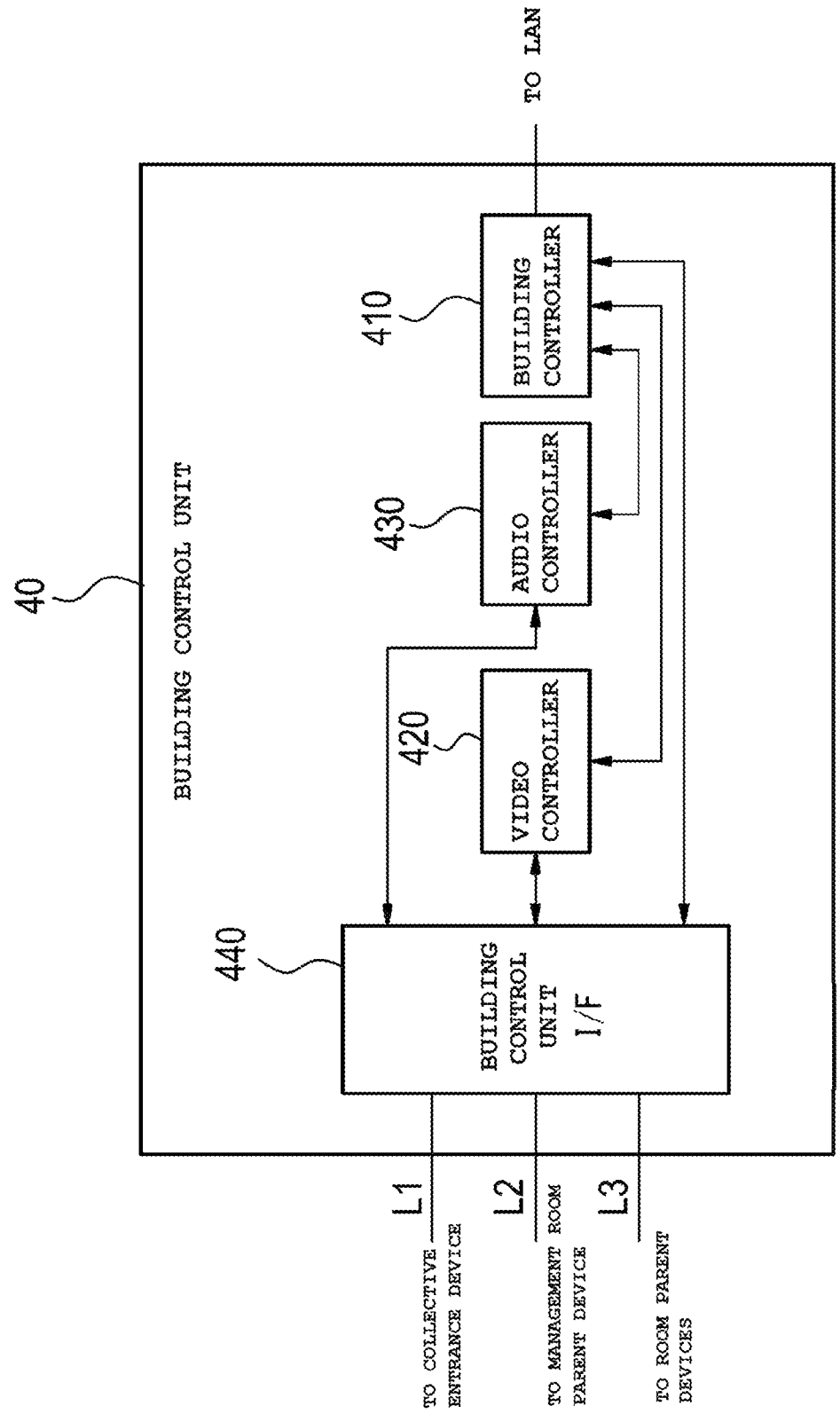
FIG. 3 is a functional block diagram of a building control unit.
Figure 4:
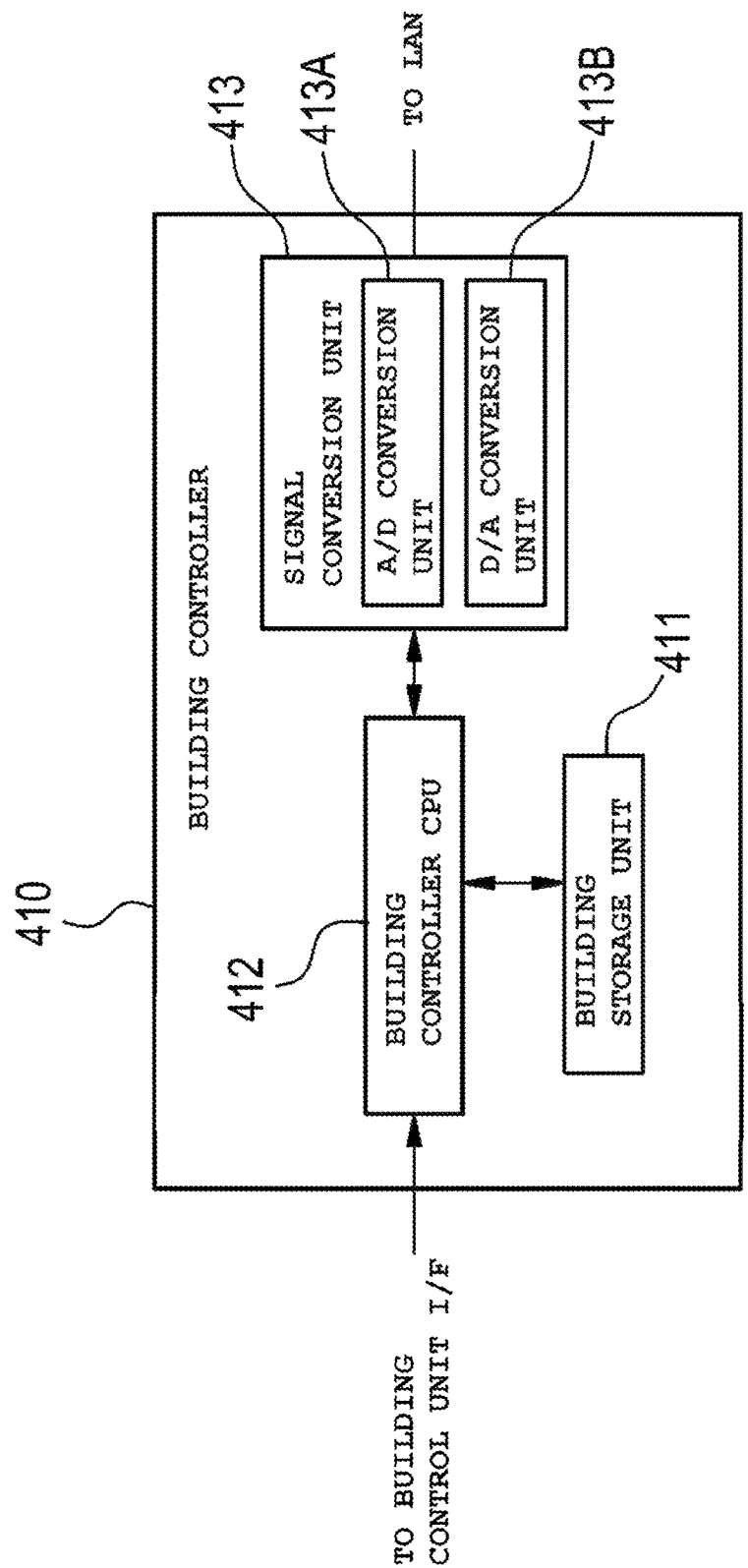
FIG. 4 is a functional block diagram of a building controller.

As shown in FIG. 3, the building control unit 40 is equipped with a building controller 410, a video controller 420, an audio controller 430, and a building control unit I/F 440. As shown in FIG. 4, the building controller 410 is equipped with a building storage unit 411, a building controller CPU 412 (example forming unit), and a signal conversion unit 413. The building controller 410 has an IP (Internet Protocol) address which is an identification number to be used when it is connected to the external network N2.

The building storage unit 411 of the building controller 410 is stored with, among other information, a call table in which room numbers of the rooms of the building where it is installed are correlated with room parent device IDs for identification of the room parent devices 30 of the rooms, respectively, or a call table in which room numbers of the rooms of the building where it is installed and names of dwellers of rooms and names (e.g., tenant names) of rooms are correlated with room parent device IDs, respectively. The building storage unit 411 is also stored with, for example, building terminal information that is a combination of the terminal information stored in the storage units 102 of the collective entrance devices 10A-10C in the building where it is installed and the terminal information stored in the storage unit of the management room parent device 20 in the building where it is installed.

The building controller CPU 412 performs processing for controlling the operation of each of the components of the building controller 410. For example, when a call signal indicating a room number or a name is transmitted from the management center 5, the building controller CPU 412 converts the input signal into a room parent device ID of a call target room parent device 30 on the basis of the call table. Furthermore, for example, the building controller CPU 412 acquires terminal information from the collective entrance devices 10A-10C in the building where it is installed and the management room parent device 20 in the building where it is installed and forms building terminal information stored in the storage unit 411.

The signal conversion unit 413 is a circuit for performing mutual conversion between a signal used in the intercom lines L1-L3 and a signal used in the network N. The signal conversion unit 413 has an analog-to-digital conversion unit 413A (example first conversion unit) and a digital-to-analog conversion unit 413B (example second conversion unit).

The analog-to-digital conversion unit 413A (in the following, the term "analog-to-digital" will be abbreviated as "A/D") converts an analog signal that can be communicated through the intercom lines L1-L3 in each residential building into a digital signal that can be communicated over the network N1 between residential buildings and between each residential building and the management center. On the other hand, the digital-to-analog conversion unit 413B (in the following, the term "digital-to-analog" will be abbreviated as "D/A") converts a digital signal that can be communicated over the network N1 between residential buildings and between each residential building and the management center into an analog signal that can be communicated through the intercom lines in each residential building.

The video controller 420 performs signal processing on a video signal taken by the camera 103 of a collective entrance device 10 or a video signal transmitted from the management center 5 and transmits a resulting video signal to each room parent device 30 or the management room parent device 20 in the building where it is installed. The audio controller 430 performs audio processing on an audio signal transmitted from the conversation unit 105 of a collective entrance device 10, the conversation unit 202 of the management room parent device 20, or the management center 5 and transmits a resulting audio signal to each room parent device 30 or the management room parent device 20 in the building where it is installed.

The building control unit I/F 440 forms a bidirectional signal transmission path between the building controller 410, the video controller 420, and the audio controller 430 and the intercom lines L1-L3.

Figure 5:
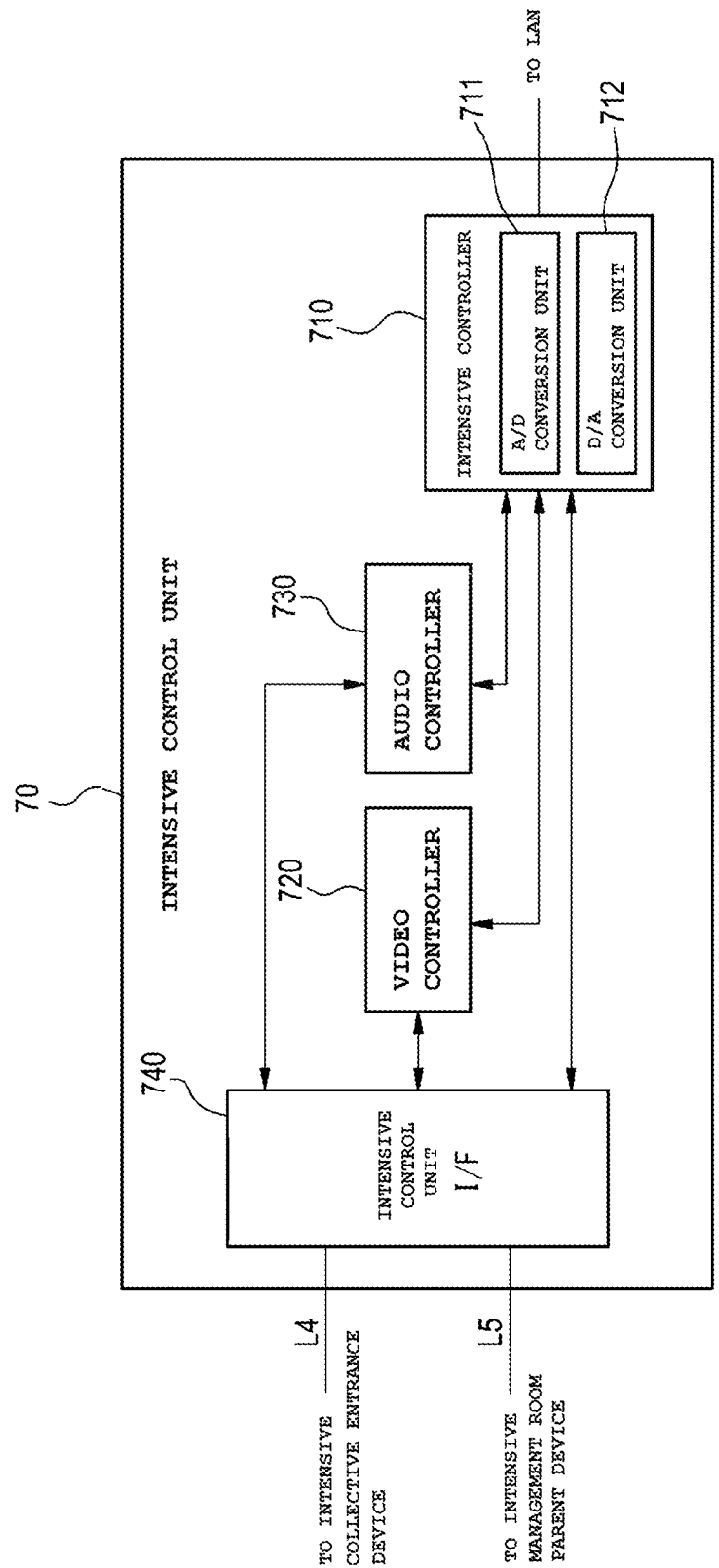
FIG. 5 is a functional block diagram of an intensive control unit.

As shown in FIG. 5, the intensive control unit 70 is equipped with an intensive controller 710, a video controller 720, an audio controller 730, and an intensive control unit I/F 740. The intensive controller 710 is equipped with an A/D conversion unit 711 (example third conversion unit) and a D/A conversion unit 712 (example fourth conversion unit).

The A/D conversion unit 711 of the intensive controller 710 converts an analog signal that can be communicated through the intercom lines L4 and L5 in the management center 5 into a digital signal that can be communicated over the network N1 between the management center 5 and each residential building. On the other hand, the D/A conversion unit 712 converts a digital signal that can be communicated over the network N1 between the management center 5 and each residential building into an analog signal that can be communicated through the intercom lines L4 and L5 in the management center 5.

The video controller 720 performs signal processing on a video signal taken by the camera 503 of the intensive collective entrance device 50 and transmits a resulting video signal to the building controller 410 of each residential building. The audio controller 730 performs audio processing on an audio signal transmitted from the communication unit 504 of the intensive collective entrance device 50 or the communication unit 602 of the intensive management room parent device 60 and transmitted a resulting audio signal to the building controller 410 of each residential building.

The intensive control unit I/F 740 forms a bidirectional signal transmission path between the intensive controller 710, the video controller 720, and the audio controller 730 and the intercom lines L4 and L5.

Figure 8:
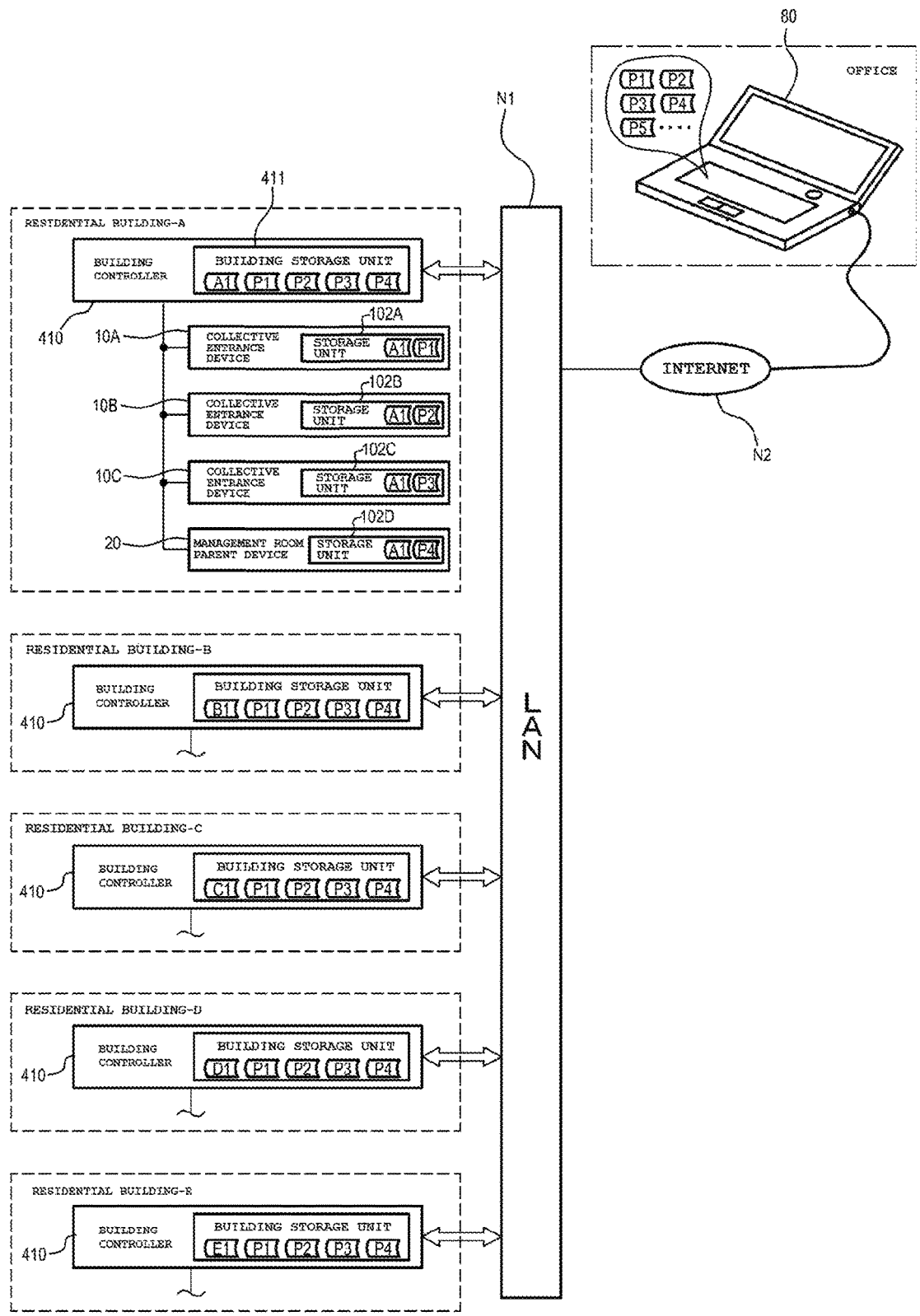
FIG. 8 illustrates an operation that is performed during maintenance work.

Next, how the intercommunication system 1 operates will be described with reference to FIGS. 6-8.

Example Operation-1

The intercommunication system 1 operates in the following manner when, for example, a visitor calls a room No. 101 of residential building-A from a collective entrance device 10 of residential building-A.

The room No. "101 (call signal)" is input using, for example, the ten-key unit of a collective entrance device 10 that is installed in residential building-A.

The collective entrance device CPU 106 converts the call signal "101" into a room parent device ID (e.g., "S1") that is correlated with "101" on the basis of a call table A1 (see FIG. 6) stored in the storage unit 102. The collective entrance device CPU 106 transmits the call signal "S1" to all of the room parent devices 30 in residential building-A over the intercom lines L1 and L3.

Receiving the call signal "S1," each room parent device 30 judges whether "S1" coincides with the room parent device ID stored in itself. If judging that they coincide with each other, the room parent device 30 of the room No. 101 transmits a return signal that to the collective entrance device 10, whereby a signal communication between the collective entrance device 10 and the room parent device 30 is enabled.

Receiving the return signal, the collective entrance device 10 again transmits a call signal "S1" to the room parent device 30 of the room No. 101. At this time, an image of the visitor taken by the camera 103 is also transmitted.

In the room parent device 30 of the room No. 101, a call sound is output and the image of the visitor is displayed on the display unit 301. If a dweller of the room No. 101 pushes a conversation button of the room parent device 30, a conversation is enabled.

The same operation is performed when the room No. 101 is called from the management room parent device 20 as when it is called from the collective entrance device 10.

Example Operation-2

The intercommunication system 1 operates in the following manner when a visitor calls a room No. 101 of residential building-A from the intensive collective entrance device 50 of the management center 5.

"A101 (call signal)" that is the room number plus the residential building name is input using, for example, the ten-key unit of the intensive collective entrance device 50. The input call signal "A101" is transmitted to the intensive control unit 70 over the intercom line L4.

The intensive controller 710 converts the call signal "A101" into a signal that can be communicated through the network N1 by means of the A/D conversion unit 711. The intensive control unit 70 transmits the resulting call signal "A101" to residential building-A to residential building-E over the network N1.

The building control unit 40 of each residential building converts the call signal "A101" into an analog signal that can be transmitted through the intercom lines, by means of the D/A conversion unit 413B of the building controller 410. The building controller CPU 412 of the building controller 410 judges whether the call signal "A101" is a call signal transmitted to the building where it is installed. Judging that it is a call signal directed to the building where it is installed, the building controller CPU 412 of residential building-A transmits a return signal to the management center 5 over the network N1.

Receiving the return signal, the intensive control unit 70 of the management center 5 again transmits a call signal "A101" to residential building-A.

The building control unit 40 of residential building-A converts the received call signal "A101" into a room parent device ID (e.g., "S1") that is correlated with "A101" on the basis of a call table A2 (see FIG. 7) by means of the building controller CPU 412 of the building controller 410. The building controller CPU 412 transmits the call signal "S1" to all of the room parent devices 30 of residential building-A over the intercom line L3.

A subsequent part of the operation is the same as in the above-described example operation-1.

The same operation is performed when the room No. 101 of residential building-A is called from the intensive management room parent device 60 as when it is called from the intensive collective entrance device 50.

Example Operation-3

The intercommunication system 1 operates in the following manner when a maintenance company carries out maintenance work.

<3-1>

First, for example, a request to the effect the collective entrance device 10A of residential building-A has become inoperative and inspection of it is requested arrives for a maintenance company from the management center 5 of the apartment complex. As shown in FIG. 8, the maintenance company accesses the building control unit 40 (building controller 410) of residential building-A in which the collective entrance device 10A in trouble is installed from, for example, its own office that is distant from the apartment complex over the network N1 using a PC 80 which is connected to the Internet N2. Although not shown in any drawings, the terminal devices are connected to the building controller 410 of each of residential building-B to residential building-E of FIG. 8 as in residential building-A.

The PC 80 transmits a diagnosis tool to the building control unit 40 and causes diagnosis of the collective entrance device 10A which is connected to the building controller 410 of the building control unit 40 by the intercom line.

The building controller CPU 412 of the building controller 410 diagnoses as to whether the collective entrance device 10A operates normally according to the diagnosis tool by exchanging signals with the collective entrance device 10A and, if it does not operate normally, diagnoses as to its cause. The building controller CPU 412 returns a diagnosis result to the PC 80.

<3-1-A>

If it is found by the diagnosis that the call table A1, for example, that is stored in the storage unit 102 of the collective entrance device 10A is damaged, the PC 80 transmits a repair tool to the building control unit 40 and causes repair of the collective entrance device 10A.

The building controller CPU 412 of the building controller 410 checks, according to the repair tool, whether the call table A1 is stored in the building storage unit 411 of the building control unit 40.

If it is found by the check that the call table A1 is stored in the building storage unit 411, the PC 80 transmits, to the building control unit 40, a transmission instruction to transmit the call table A1 to the collective entrance device 10A.

Following the transmission instruction, the building controller CPU 412 transmits the call table A1 to the collective entrance device 10A.

The transmitted call table A1 is stored in the storage unit 102A of the collective entrance device 10A.

After the storage of the call table A1, the PC 80 again causes the building control unit 40 to diagnose the operation of the collective entrance device 10A. If normal operation is confirmed resultantly, the maintenance work is finished.

<3-1-B>

If it is found by the diagnosis that driver software P1, for example, that is stored in the storage unit 102 of the collective entrance device 10A is damaged, as in the above case of <3-1-A> a repair tool etc. are transmitted and whether the driver software P1 is stored in the building storage unit 411 is checked.

If it is found by the check that the driver software P1 is stored in the building storage unit 411, as in the above case of <3-1-A> the PC 80 transmits, to the building control unit 40, a transmission instruction to transmit the driver software P1. Following the transmission instruction, the building controller CPU 412 transmits the driver software P1 to the collective entrance device 10A.

On the other hand, if it is found by the check that the driver software P1 is not stored in the building storage unit 411, the PC 80 transmits the driver software P1 stored in itself to the building control unit 40 and transmits, to the building control unit 40, a transmission instruction to transmit the driver software P1 to the collective entrance device 10A. The building controller CPU 412 stores the transmitted driver software P1 in the building storage unit 411 as backup data and, following the transmission instruction, transmits the driver software P1 to the collective entrance device 10A.

The transmitted driver software P1 is stored in the storage unit 102A of the collective entrance device 10A.

Then the maintenance work is finished in the same manner as in the above case of <3-1-A>.

<3-2>

For example, a request for regular maintenance of the intercommunication system of residential building-A arrives for a maintenance company from the management center 5 of the apartment complex. As shown in FIG. 8, as in the above case of <3-1>, the maintenance company accesses the building control unit 40 (building controller 410) of residential building-A over the network N1 using the PC 80.

The PC 80 transmits a diagnosis tool to the building control unit 40 and causes diagnosis of the operation of the building control unit 40.

The building controller CPU 412 of the building controller 410 diagnoses the operation according to the diagnosis tool and, trouble is found, diagnoses as to its cause. The building controller CPU 412 returns a diagnosis result to the PC 80.

If it is found by the diagnosis that the call table A1, for example, that is stored in the building storage unit 411 of the building controller 410 is damaged, the PC 80 transmits a repair tool to the building control unit 40 and causes repair of itself.

The building controller CPU 412 of the building controller 410 detects, according to the repair tool, a terminal device(s) (collective entrance device 10a, 10b, or 10c or management room parent device 20) that is stored with the call table A1. The building controller CPU 412 acquires the call table A1 (terminal information) from, for example, the storage unit 102A of the collective entrance device 10A that is stored with the call table A1, stores it in the building storage unit 411, and forms building terminal information of the building storage unit 411 by supplement it with the missing information.

On the other hand, if it is found by the diagnosis that driver software P2, for example, that is stored in the building storage unit 411 of the building controller 410 is damaged, the building controller CPU 412 detects, in the same manner as described above, a terminal device(s) that is stored with the driver software P2. The building controller CPU 412 acquires the driver software P2 (terminal information) from the storage unit 102B of the collective entrance device 10B, stores it in the building storage unit 411, and forms building terminal information of the building storage unit 411 by supplement it with the missing information.

Then the maintenance work is finished in the same manner as in the case <3-1-A>.

Example Operation 4

When a room parent device 30 is called, the intercommunication system 1 operates as described below.

In each residential building, if a room parent device 30 installed therein is called from a terminal device (collective entrance device 10A, 10B, or 10C or management room parent device 20) which is connected to the building control unit 40 via the intercom lines, the building controller 410 stores its log in the building storage unit 411. On the other hand, if a room parent device 30 installed in a residential building is called, the building controller 410 stores its log in the building storage unit 411. The stored log can be used when an incident, an accident, or the like occurs. Logs can be stored by each building controller 410 without the need for installing a device dedicated to log storage.

According to the above-described intercommunication system 1, in the event of trouble occurring in a terminal device (collective entrance device, management room parent device, or the like) of one of residential building-A to residential building-E, a maintenance company can access the building control unit 40 of the residential building in which the terminal device in trouble is installed using, for example, a PC 80 that is connected to the Internet N2. The accessed building control unit 40 of the residential building is connected to the terminal devices in the residential building by the intercom lines. Thus, the maintenance company can carry out maintenance work for the terminal device in trouble via the building control unit 40. In this manner, the maintenance company can carry out maintenance work from, for example, an external location that is distant from the apartment complex without the need for sending a person to the residential building where the terminal device in trouble exists. The load of maintenance by the maintenance company can thus be reduced.

The building control unit 40 of each residential building is equipped with the A/D conversion unit 413A and the D/A conversion unit 413B that enable conversion between an analog signal that can be communicated through the intercom lines and a digital signal that can be communicated through the network. Thus, even if, for example, residential buildings employ sets of intercom lines that are different from each other in signal format, all the residential buildings can be connected to each other so as to be able to communicate with each other by the network N1 in which a communication is performed according to the general-purpose protocol.

The building terminal information that is a combination of the pieces of terminal information stored in the storage units 102 of the collective entrance devices 10A-10C and the management room parent device 20 in the building where each building controller 410 is installed is stored in the building storage unit 411 of the building controller 410. Thus, when the terminal information stored in one of the storage units 102 has been damaged, the damaged information can be repaired using, as backup data, the building terminal information stored in the building storage unit 411 of the building controller 410.

When the building terminal information stored in the building storage unit 411 of a building controller 410 is damaged, the building terminal information can be restored by acquiring pieces of terminal information from the storage units 102 of terminal devices. The building terminal information may be restored automatically on a regular basis by making time setting.

The invention is not limited the above embodiment, and various modifications, improvements, etc. can be made as appropriate. And the material, shape, dimensions, related numerical values, form of implementation, number (where plural ones are provided), location, etc. of each constituent element of the embodiment are optional and no limitations are imposed on them as long as the invention can be implemented.

Although the invention has been described in detail by referring to the particular embodiment, it is apparent to those skilled in the art that various changes and modifications are possible without departing from the spirit and scope of the invention.

The present application is based on Japanese Patent Application No. 2016-063065 filed on Mar. 28, 2016, the contents of which are incorporated herein by reference.

DESCRIPTION OF SYMBOLS

1: Intercommunication system; 5: Management center; 10A-10C: Collective entrance devices (example terminal devices); 20: Management room parent device (example terminal device); 30: Room parent device; 40: Building control unit; 50: Intensive collective entrance device; 60: Intensive management room parent device; 70: Intensive control unit; 80: External apparatus; 101: Call unit; 102: Storage unit; 106: Collective entrance device CPU; 107: Collective entrance device I/F; 410: Building controller; 411: Building storage unit; 412: Building controller CPU (example forming unit); 413A: A/D conversion unit (example first conversion unit); 413B: D/A conversion unit (example second conversion unit); 440: Building control unit I/F; 710: Intensive controller; 711: A/D conversion unit; 712: D/A conversion unit.

The invention claimed is:

1. An intercommunication system which is used in an apartment complex comprising plural residential buildings, each of the plural residential buildings comprising:
  room parent devices installed in respective rooms;
  a terminal device which enables a call manipulation for calling one of the room parent devices; and
  a building control unit, located separately from the room parent devices and the terminal device, which connects, by an intercom line, the terminal device and the room parent devices of the respective rooms of the residential building, wherein:
  the terminal device comprises a storage unit which is stored with device call table with information common to the terminal device of each of the plural residential buildings; and
  the building control units of the plural respective residential buildings each comprise a building controller and are connected to each other by a network in which a communication is performed according to a general-purpose protocol and can communicate, over the network, with an external apparatus that is connected to an external network, wherein the building controller has a building storage unit which is stored with building terminal information that is a combination of pieces of terminal information stored in the storage units of the plural respective terminal devices in the at least one residential building, wherein the pieces of terminal information include one or more residents' names with associated room parent identification information;

wherein the building controller comprises a forming unit which forms the building terminal information by acquiring the pieces of terminal information including the one or more residents' names with associated room parent identification information from the plural terminal devices that are installed in the building where the building controller is installed and are connected to the building controller.

2. The intercommunication system according to claim 1, wherein the building controller of the building control units of the plural respective buildings have:
 a first conversion unit which converts a signal that can be communicated through the intercom line in the building where the building control unit is installed into a signal that can be communicated through the network according to the general-purpose protocol; and
 a second conversion unit which converts a signal that can be communicated through the network according to the general-purpose protocol into a signal that can be communicated through the intercom line in the building where the building control unit is installed.

3. The intercommunication system according to claim 1, wherein:
 plural terminal devices are installed in at least one of the residential buildings.

4. An intercommunication system which is used m a building complex comprising plural buildings, each of the plural buildings comprising:
 room parent devices installed in respective rooms;
 a terminal device which enables a call manipulation for calling one of the room parent devices; and
 a building control unit, which connects the terminal device and the room parent devices of the respective rooms of the building, wherein
 the terminal device comprises a storage unit which is stored with device call table with information common to the terminal device of each of the plural buildings; and
 the building control units of the plural respective buildings each comprise a building controller and are connected to each other by a network in which a communication is performed according to a general-purpose protocol and can communicate, over the network, with an external apparatus that is connected to an external network, wherein the building controller has a building storage unit which is stored with building terminal information that is a combination of pieces of terminal information stored in the storage units of the plural respective terminal devices in the at least one building, wherein the pieces of terminal information include one or more residents' names with associated room parent identification information, wherein the building controller comprises a forming unit which forms the building terminal information by acquiring the pieces of terminal information including the one or more residents' names with the associated room parent identification information from the plural terminal devices that are installed in the building where the building controller is installed and are connected to the building controller.

5. A method for establishing an intercommunication system for a building complex comprising plural buildings, the method comprising:
 installing room parent devices in each of the plural buildings in respective rooms;
 installing a terminal device in the each of the plural buildings which enables a call manipulation for calling one of the room parent devices;
 installing a building control unit comprising a building controller for the each of the plural buildings, which connects the terminal device and the room parent devices of the respective rooms of the building;
 storing a storage unit of the terminal device with device call table with information common to the terminal device of each of the plural buildings;
 connecting the building control units of the plural respective buildings to each other by a network in which a communication is performed according to a general-purpose protocol and can communicate, over the network, with an external apparatus that is connected to an external network;
 storing in a building, storage unit of the building controller building terminal information that is a combination of pieces of terminal information stored in the storage units of the plural respective terminal devices in the at least one building,
 wherein the pieces of terminal information include one or more residents' names with associated room parent identification information; and
 forming the building terminal information via the building controller by acquiring the pieces of terminal information including the one or more residents' names with the associated room parent identification information from the plural terminal devices that are installed in the building where the building controller is installed and are connected to the building controller.

* * * * *